United States Patent
Sutton et al.

(10) Patent No.: US 8,446,932 B2
(45) Date of Patent: May 21, 2013

(54) METHOD FOR RECONSTRUCTING THE CHARACTERISTICS OF TRANSMITTED CDMA WAVEFORMS

(75) Inventors: Christopher K. Sutton, Everett, WA (US); Lawrence D. Bennett, Mukilteo, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 595 days.

(21) Appl. No.: 12/710,312

(22) Filed: Feb. 22, 2010

(65) Prior Publication Data

US 2011/0206091 A1    Aug. 25, 2011

(51) Int. Cl.
*H04B 1/00* (2006.01)

(52) U.S. Cl.
USPC ........... 375/150; 375/130; 375/140; 375/147; 375/316

(58) Field of Classification Search
USPC .................. 375/150, 130, 147, 140, 316
See application file for complete search history.

(56) References Cited

U.S. PATENT DOCUMENTS

| | | | | |
|---|---|---|---|---|
| 5,488,629 | A * | 1/1996 | Takahashi et al. | 375/150 |
| 5,610,939 | A * | 3/1997 | Takahashi et al. | 375/150 |
| 2002/0034944 | A1* | 3/2002 | Tanno et al. | 455/434 |
| 2002/0137548 | A1* | 9/2002 | Miya | 455/562 |
| 2004/0240533 | A1* | 12/2004 | Kitagawa et al. | 375/150 |
| 2009/0080385 | A1* | 3/2009 | Kim et al. | 370/336 |
| 2009/0296862 | A1* | 12/2009 | Nakaya | 375/343 |
| 2011/0149779 | A1* | 6/2011 | Richards et al. | 370/252 |

OTHER PUBLICATIONS

Agilent Design and Testing 3GPP W-CDMA User Equipment Application Note 1356, Agilent Technologies, Inc., Feb. 21, 2003, pp. 1-56.

* cited by examiner

*Primary Examiner* — Kenneth Lam

(57) ABSTRACT

A waveform reconstruction system and method for using the same are disclosed. The system includes an RF down-converter that receives a signal and outputs a down-converted signal. A demodulator demodulates the down-converted signal to generate a recovered digital data stream. A pattern detector detects a predetermined pattern in the recovered digital data stream. A delay generator delays the down-converted signal and outputs a delayed copy thereof. A signal processing circuit combines the delayed copy with previously received delayed copies of the down-converted signal to reconstruct an averaged waveform from the plurality of delayed copies having the predetermined pattern.

20 Claims, 8 Drawing Sheets

METHOD FOR RECONSTRUCTING THE CHARACTERISTICS OF TRANSMITTED CDMA WAVEFORMS

BACKGROUND OF THE INVENTION

Digital transmission systems that allow a large number of transmitters, each with a plurality of data channels, to share a single band of the frequency spectrum are used in cellular communications and the like. Within each transmitter, each data stream is spread over the frequency band and combined with other orthogonally spread data streams. This combined spread spectrum signal is then scrambled using a code that allows the combined data streams from one transmitter to be separated upon reception from those of other transmitters in the same frequency band. In the following discussion, this final spread and scrambled signal will be referred to as the "chip-rate" analog waveform. The chip rate analog waveform is then up-converted to the desired transmitter frequency.

In a number of applications, it is desirable to measure the characteristics of the chip rate analog waveform from a specific transmitter for diagnostic purposes. Prior art methods for measuring the chip rate analog waveform of a transmitter require that the signal transmitter be isolated from other transmitters, since each additional transmitter appears to be a noise source with respect to the transmitter whose signal is to be measured. As a result, such measurements have typically been made in a laboratory setting in which there are no competing transmitters to interfere with the measurement of the desired transmitter. While such measurements are useful in characterizing a transmitter, they are not applicable to characterization in actual use in the field. Accordingly, it would be advantageous to be able to measure the chip rate analog waveform of a transmitter in the field during actual operation and in the presence of competing transmitters.

SUMMARY OF THE INVENTION

The present invention includes a waveform reconstruction system and method for reconstructing a waveform. The system includes an RF down-converter that receives a signal and outputs a down-converted signal. A demodulator demodulates the down-converted signal to generate a recovered digital data stream. A pattern detector detects a predetermined pattern in the recovered digital data stream. A delay generator time delays the down-converted signal and outputs a delayed copy thereof. A signal processing circuit combines the delayed copy with previously received delayed copies of the down-converted signal to reconstruct an averaged waveform from the plurality of delayed copies having the predetermined pattern.

In one aspect of the invention, the pattern detector detects a plurality of different predetermined patterns in the received digital data stream and generates a code indicative of which of the plurality of patterns has been detected. The signal processing circuit includes a memory for storing an average signal for each of a plurality of different portions of the down-converted signal, each portion corresponding to a different one of the predetermined patterns.

In another aspect of the invention, the pattern detector includes a decoder that generates a received data stream. The received data stream is then re-encoded to generate an ideal data symbol stream. The ideal data symbol stream is used by the pattern detector to detect the predetermined pattern.

DETAILED DESCRIPTION OF THE PREFERRED EMBODIMENTS OF THE INVENTION

Figure 1:
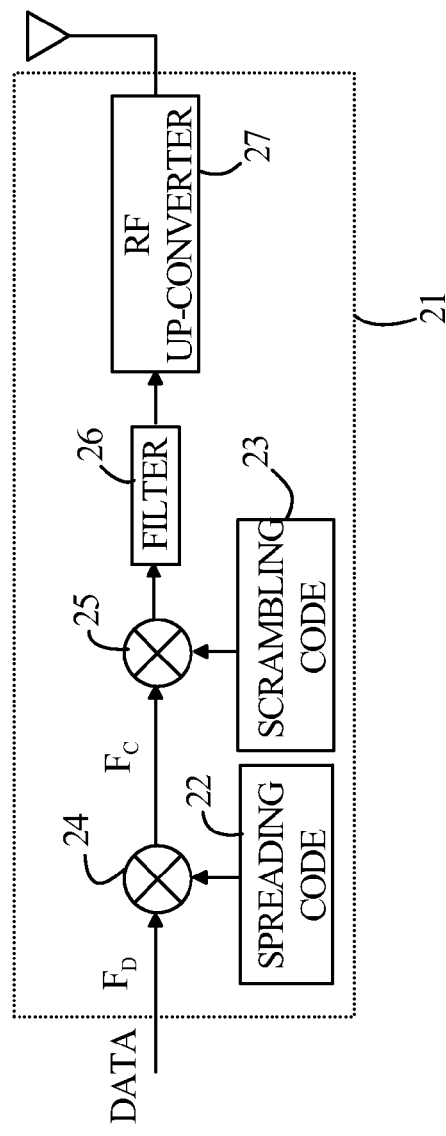
FIG. 1 illustrates a simplified schematic of a transmitter for use with Direct Sequence Code Division Multiple Access (DS-CDMA) modulation.

The manner in which the present invention provides its advantages can be more easily understood with reference to FIG. 1, which illustrates a simplified schematic of a transmitter for use with DS-CDMA modulation. Transmitter 21 receives a data stream at a rate of $F_d$ bits/second. To simplify the following discussion, it will be assumed the data being transmitted is binary in nature; however, as will be explained in more detail below, data characters having more than two states can also be utilized. A spreading code generator 22 replaces each bit by a sequence of bits by mixing the input data stream in a mixer 24 with a spreading code having $N_s$ bits to generate a new sequence having a data rate of $F_c$. Again, to simplify the following discussion, it will be assumed that $F_c/F_d=N_s$ and that the encoded sequence for any bit does not overlap the sequences for the previous or prior bits. The encoded sequence will have its energy spread over the entire band of interest when this sequence is finally transmitted.

The encoded sequence is mixed in mixer 25 with a scrambling code produced by scrambling code generator 23. The scrambling code is designed to allow the transmissions from this transmitter to be differentiated from data streams transmitted by other transmitters using the same frequency band. The scrambling codes are typically long pseudorandom sequences. The output of the scrambler is then filtered through bandwidth limiting filter 26 and up-converted by RF up-converter 27 for transmission.

Figure 2:
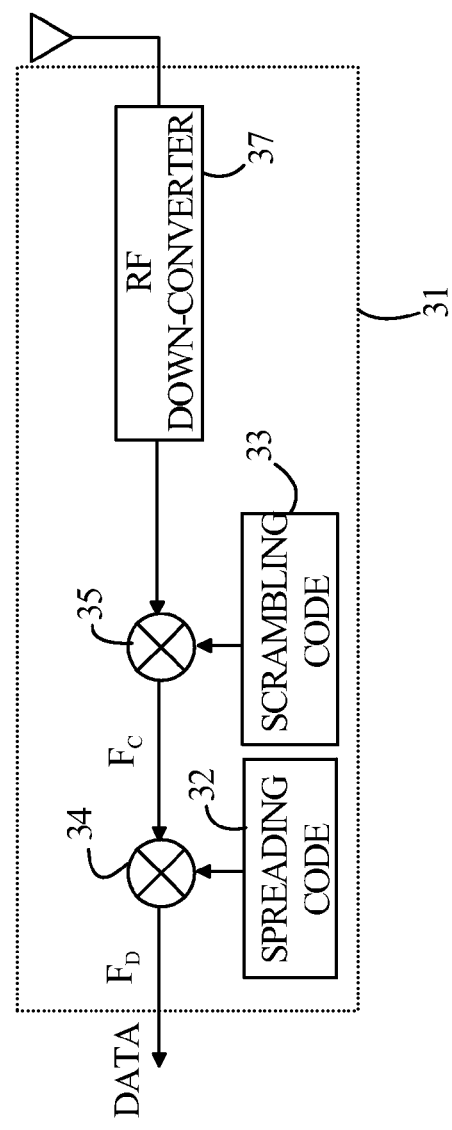
FIG. 2 illustrates a receiver that is designed to receive the data transmission.

Refer now to FIG. 2, which illustrates a receiver that is designed to receive the data transmission from transmitter 21. Receiver 31 includes an RF down-converter that down-converts transmissions in the RF frequency band in question to base band. The base band signal is then mixed with the inverse scrambling code generated by scrambling code generator 33 used to scramble the signal in receiver 21. The output of mixer 35 is then mixed in mixer 34 with the inverse spreading code generated by spreading code generator 32 to generate the recovered data.

It should be noted that transmitter and receiver are synchronized with one another. The methods for accomplishing this synchronization are conventional in the art, and hence, will not be discussed in detail here.

The scrambling code assures that transmissions from other transmitters operating in the same manner on the same RF frequency band are not decoded by receiver 31. However, these other transmissions appear as noise to receiver 31. Since there can be a large number of such transmitters, the noise levels can make it difficult to isolate the portion of the output of down-converter 37 that is generated by transmitter 21. This portion of the output is useful in characterizing the overall system performance in the field, including the distortions introduced by the characteristics of transmitter 21, or characteristics of the transmission channel such as signals reaching the receiver via multiple paths due to reflections off of buildings or other objects.

The present invention is based on the observation that the contribution of the noise sources in the waveform generated by down-converter 37 is on average zero. Hence, if one could average the waveform generated by RF down-converter 37 over a large number of identical transmissions from transmitter 21, the resultant average would be a good representation of the waveform from transmitter 21 in the absence of signals from the other transmitters and noise. If the test engineer has control of transmitter 21, a specific data sequence could be sent repetitively until the average no longer displays the effects of the noise sources including the other transmitters operating in the band of interest. This average waveform could then be used to examine characteristics in the transmission due to the characteristics of transmitter 21 or the transmission channel between transmitter 21 and receiver 31.

However, in many situations of interest, the test engineer at receiver 31 does not have control of transmitter 21. For example, when the transmitter is a cellular telephone in the possession of its owner, the test engineer cannot provide a known test data stream.

The present invention is based on the observation that any particular N-chip data sequence is just as likely to be transmitted from transmitter 21 than any other sequence. Hence, if one could distinguish the transmissions in which the desired chip sequence is being sent and average the output of RF down-converter 37 only during those transmissions, the desired average waveform could be reconstructed.

Figure 3:
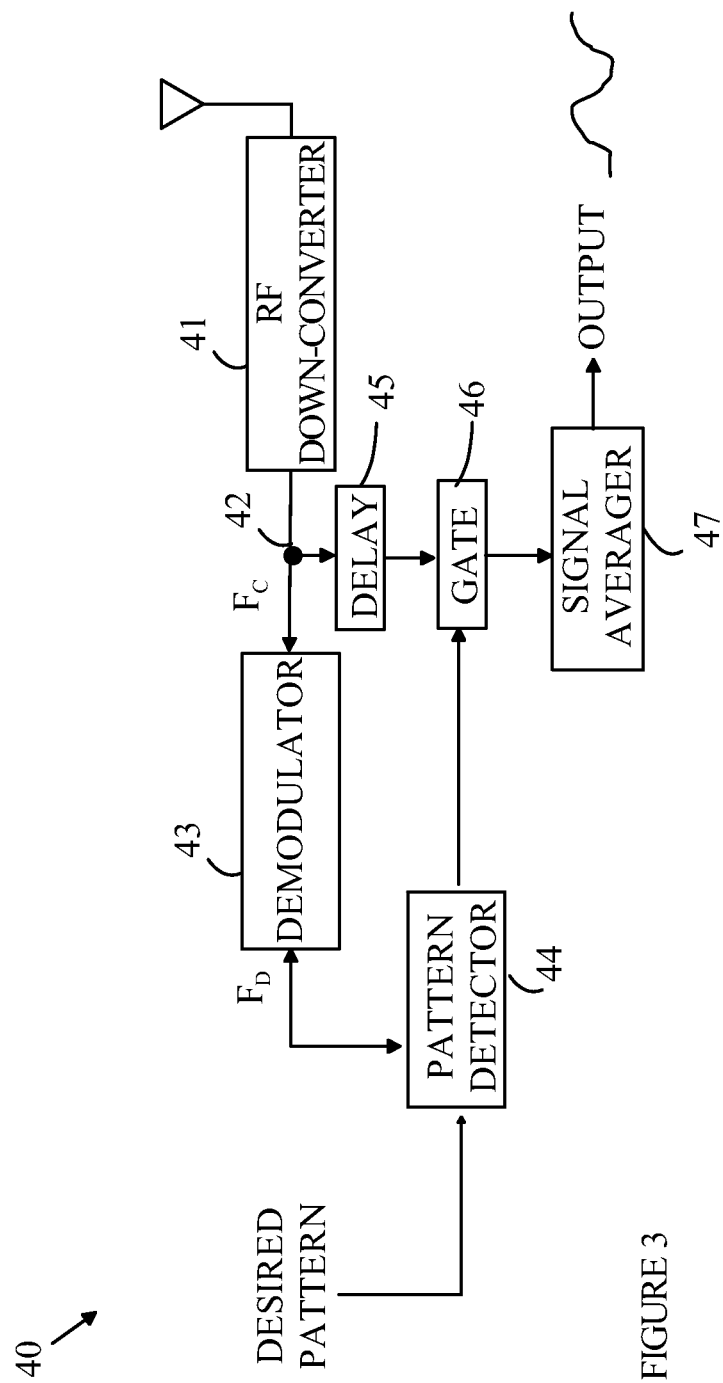
FIG. 3 is a simplified view of a waveform reconstruction system according to one embodiment of the present invention.

This waveform reconstruction method also applies to transmission systems that do not use DS-CDMA modulation. Refer now to FIG. 3, which is a simplified view of a waveform reconstruction system according to one embodiment of the present invention. Waveform reconstruction system 40 receives the transmissions with an RF down-converter 41, which will be assumed to down-convert the received signal to base band. The received signal is output to node 42. The signal at node 42 is split. A portion of the signal is input to demodulator 43, which includes the symbol clock recovery and slicing needed to arrive at the received data symbol stream corresponding to the transmitted data symbol stream.

The output of demodulator 43 is input to a pattern detector 44 that stores the last N symbols of the data stream that were received and compares the stored symbols with a desired N-symbol data pattern. If the desired pattern is detected, a gate 46 is placed in a transmissive state for a time period corresponding to the time of transmission for the N-symbol pattern. The signal at node 42, after a delay provided by delay circuit 45, is input to signal averaging circuit 47. The signal that is passed by the gate is the output of RF down-converter 41 as a function of time over the period in which the N-symbol pattern was received. Signal averager 47 adds each time point to a corresponding memory location within signal averager 47. The average signal accumulated by signal averaging circuit 47 is the reconstructed waveform. The reconstructed waveform is then output in a form that the test engineer can utilize. For example, the waveform can be displayed on a computer display terminal or the like as a graph of the output of RF down-converter 41 as a function of time.

Figure 4A:
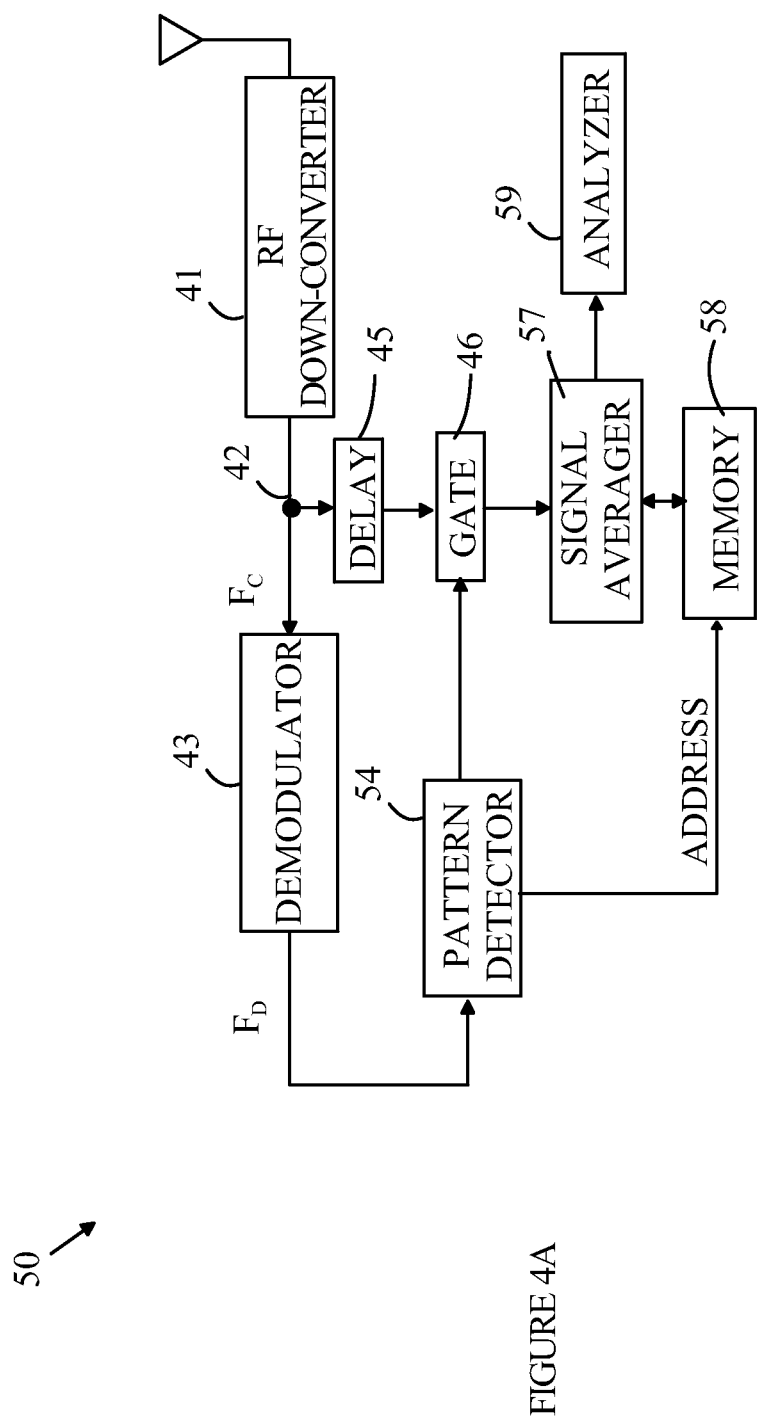
FIG. 4A illustrates another embodiment of a waveform reconstruction system according to the present invention.

While the embodiment shown in FIG. 3 will provide the desired waveform, the efficiency with which it provides that data is quite poor. In the case of binary symbols, the desired N-symbol pattern is expected to occur on average once in every $2^N$ sequences of length N. Hence, if the desired sequence is 10 bits long, only one out of every 1024 detected sequences is used. The remaining data is wasted. Refer now to FIG. 4A, which illustrates another embodiment of a waveform reconstruction system according to the present invention. Waveform reconstruction system 50 improves upon this inefficiency by simultaneously accumulating averages for each of the possible N-symbol sequences. Pattern detector 54 stores the last N-symbols that have been demodulated. When each symbol is received, the last N-symbol sequence is used to address a memory 58 that has words that are sufficiently long to store a running average for that sequence. At each symbol interval, gate 46 is activated, and signal averaging circuit 57 updates the running average for the particular N-symbol sequence that was received. When sufficient data has been accumulated, the data in memory 58 is output to analyzer 59 for examination by the test engineer.

A second method for further improving the efficiency of the system is to organize the memory as a cyclic De Bruijn sequence of length n. Since such sequences are known in the art, they will not be discussed in detail here. For the purposes of the present discussion, it is sufficient to note that a k-ary De Bruijn sequence B(k, n) of order n, is a cyclic sequence for which every possible symbol pattern of length n appears as a sequence of consecutive symbols exactly once, and that B(k, n) has length $k^n$. In the case of binary symbols, such a sequence has the property that each of the $2^n$ possible patterns of length n is contained somewhere in the circular sequence; however, the length of the sequence ($2^n$) is considerably smaller than the number of memory locations in the scheme discussed above ($n2^n$). In effect, the address provides the starting location in the sequence. The digitized values from node 42 are added to those in the circular buffer starting at the determined location. The said improved efficiency results in less averaging time to achieve a given signal to noise ratio, a more concise representation of the reconstructed waveform, and less memory required.

Figure 4B:
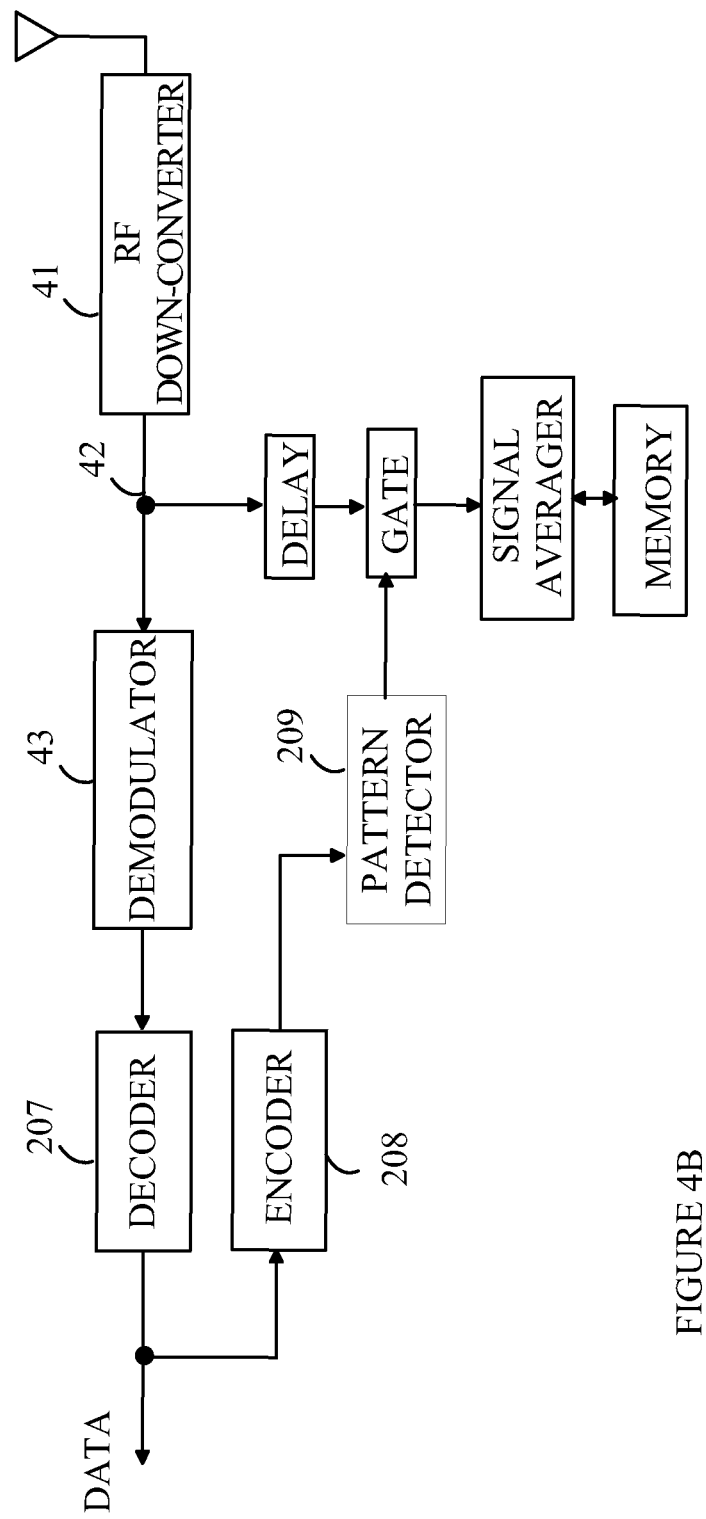
FIG. 4B illustrates another embodiment of a waveform reconstruction system according to the present invention.

The embodiment of FIG. 4A will generate the desired waveform when there is a 1 to 1 correspondence between the symbols detected at the output of demodulator 43 and the transmitted symbols. Some transmission systems include encoding of the data stream to implement forward error correction and the like. In these systems, the receiver includes a decoder which decodes the demodulated data symbol stream to output a received data stream. This received data stream may not have this 1 to 1 correspondence to the transmitted symbols. Refer now to FIG. 4B, which illustrates another embodiment of a waveform reconstruction system that does not require said 1 to 1 correspondence. The output of decoder 207 is a decoded data stream, which is re-encoded by encoder 208 to generate an ideal re-encoded symbol stream, which is evaluated by the pattern detector 209.

Figure 5:
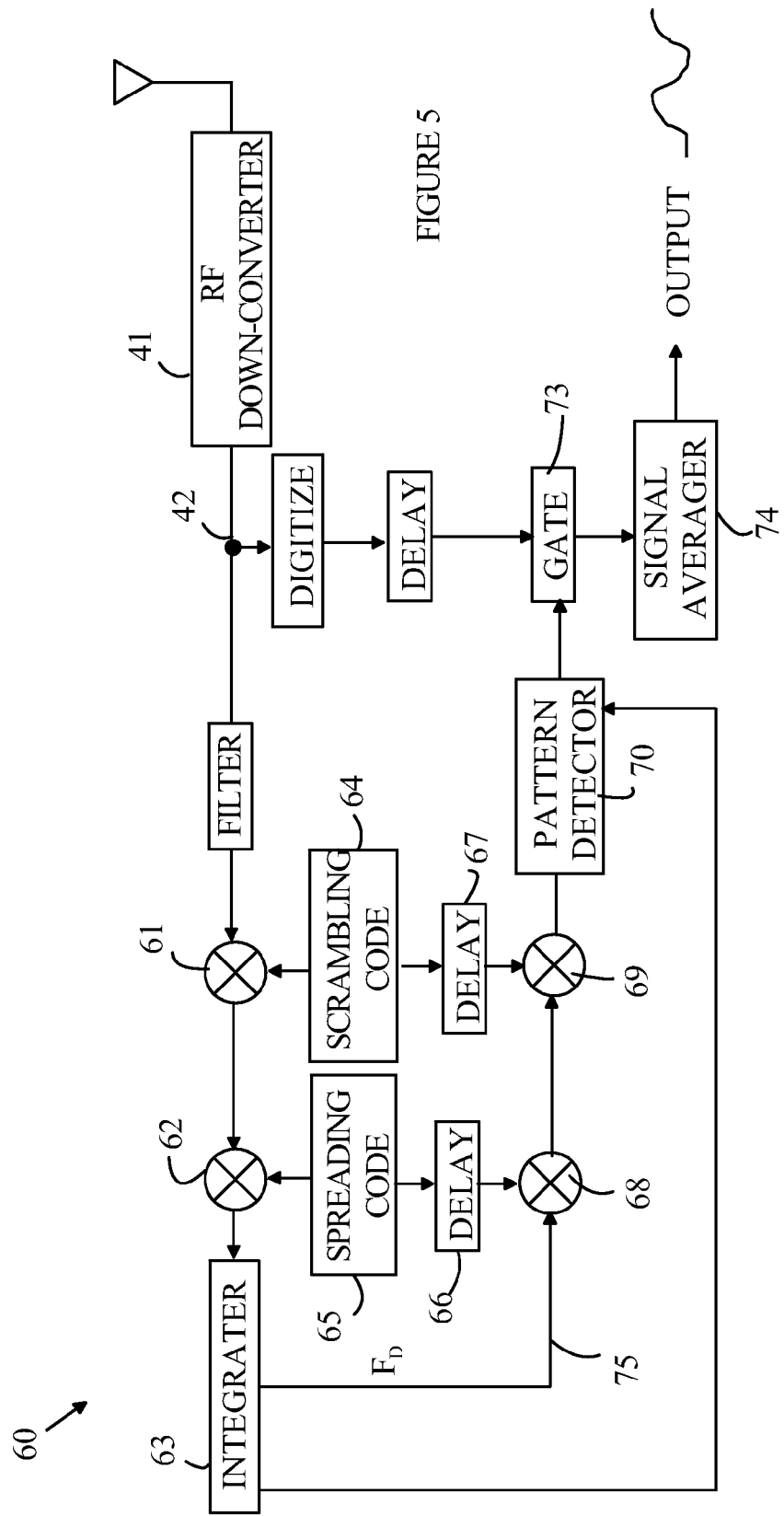
FIG. 5 illustrates another embodiment of a waveform reconstruction system according to the present invention.

Refer now to FIG. 5, which illustrates another embodiment of a waveform reconstruction system according to the present invention which generates an ideal encoded waveform for pattern detection of direct sequence spread spectrum, CDMA, and the like. In waveform reconstruction system 60, the output of RF down-converter 41 is again assumed to have been shifted to base band. The signal at node 42 is decoded by descrambling the signal using scrambling code generator 64 that generates an inverse scrambling signal that is mixed with the base band signal by mixer 61. The descrambling operation enables separation of the signal generated by the transmitter of interest from the signals generated by other transmitters that are operating in the RF band of interest. The descrambled signal is then mixed with a code that is the inverse of the spreading code used to spread the original data symbol stream. This sequence is generated by spreading code generator 64. Once again, it is assumed that the spreading code generator and scrambling code generator have been synchronized with the transmitter in question.

The output of mixer 62 is integrated over each data symbol period to recover the data symbol that was sent. Integrator 63 includes a discriminator that assigns the appropriate symbol value based on the result of the integration. The data symbol stream at node 75 is the received version of the data symbol stream that was encoded and sent at the transmitter being studied. In some cases, this data symbol stream can be used at the input to the pattern detector directly; in other cases, it must be re-encoded to provide an ideal spread and scrambled signal that is used as the input to the pattern detector as shown in FIG. 5. The data symbol stream at node 75 is converted to an ideal spread and scrambled chip-rate sequence by mixing it with the spreading code and scrambling code using mixers 68 and 69. The spreading code is generated by spreading code generator 65, and the scrambling code is generated by scrambling code generator 64. Each code is delayed as shown at 66 and 67 to assure that the re-encoding operation is properly synchronized. The pattern detector then examines the ideal spread and scrambled chip-rate sequence to determine if the data on node 42 should be input to signal averager 74. If the pattern matches, gate 73 is activated and the values received at node 42 are added to the average after being digitized and appropriately delayed.

If the spreading and scrambling code sequences are the same for every data symbol at the input to transmitter 21, then triggering the signal averaging circuit based on a pattern in the received data symbol sequence should be equivalent to triggering the signal averaging circuit based on a pattern in the chip-rate sequence generated by re-spreading and re-scrambling the received data symbol sequence, since there is a unique one-to-one mapping between each data symbol and its corresponding chip sequence. If, however, the spreading code sequence or scrambling code sequence is not the same for every data symbol, a pattern in the ideal spread and scrambled chip-rate sequence must be utilized to determine if the data on node 42 should be input to signal averager 74.

The above embodiments assume that the noise level, including any interference from other transmitters on the RF band in question, is sufficiently low to allow accurate decoding of the data. If the noise level is too high, integrator 63 will generate a signal that is indeterminate. That is, the level will neither be consistent with a one nor a zero. In this case, the regenerated pattern may not be correct and using that pattern to trigger the gate would degrade the average being accumulated by signal averager 74. In one aspect of the invention, integrator 63 generates an abort signal that is transmitted to pattern detector 70 to indicate that the data is unreliable and that the current reconstructed sequence should not be used. An abort signal could also be generated from other reception quality indicators common in RF communications such as forward error correction and the like.

To simplify the following discussion, the sequence of chips generated by mixing the scrambling code 23 with the output of the spreading code mixer 24 will be referred to as the scrambled chip sequence in the following discussion. If the scrambling and spreading codes repeat over the time period of one symbol at the input to transmitter 21, each data symbol from transmitter 21 is mapped to a scrambled chip sequence that only depends on that data symbol. The scrambled chip sequence has a chip rate of $F_c$, each chip occupying a time interval of $1/F_c = T_c$.

Consider the case in which the multi-path delay is of the order of $2T_c$. Then each chip within the scrambled chip sequence will be corrupted by a signal from a chip that was transmitted at a time $2T_c$ earlier. The chips in the interior of a scrambled chip sequence corresponding to a particular data symbol being transmitted will all be corrupted in the same manner, since the corrupting chip will always have the same values each time a particular data symbol or predetermined sequence of data symbols are sent. Hence, the average of a number of copies of a predetermined scrambled chip sequence will exhibit the corruption in question. However, the two chips at the beginning of a scrambled chip sequence corresponding to a particular encoded data symbol will be corrupted by the last two chips of the scrambled chip sequence corresponding to the previously encoded and transmitted data symbol. Since the previously encoded data symbols change during the transmission, this corruption changes depending on the previous data symbol value, and hence, the average of the scrambled chip sequence in the first two scrambled chips will have a distortion that is not easily measured, since it is data dependent.

From this simple example, it will be apparent that the averaged waveform at chip positions that are far from the ends of a scrambled chip sequence provides a better measure of transmitter or channel characteristics than the chip positions at the ends of the averaged waveform. In one aspect of the present invention, the averaging process utilizes a weighted average in which chips within a scrambled chip sequence are given a higher weighting than those at the ends of the scrambled chip sequence being studied. This weighting procedure is particularly useful in embodiments that utilize the cyclic De Bruijn sequence discussed above for storing the averaged waveforms.

The above-described embodiments of the present invention have been described in terms of a binary data stream that is encrypted with binary spreading code and a binary scrambling code. However, embodiments of the present invention that operate on non-binary complex data can also be constructed. For example, the input data stream could be a stream of characters in which each character has M states, where M>2. Such data characters will be referred to as M-ary symbols in the following discussion.

Code schemes that spread such data over a predetermined frequency band are known to the art, and hence, will not be discussed in detail here. In one exemplary coding scheme, each of the M possible states is replaced by a sequence of characters in which each character has M' states. Here, M'>1 and may be different from the M states of the data sequence. For example, M' is set by the noise levels on the communication channel in some applications. For simplicity, it will be assumed that the encoded sequences for each input character do not overlap; however, embodiments in which the code sequences overlap and are added together to form a combined encoded data stream are also known to the art. The encoded data stream is then replaced with a scrambled data stream that allows the transmissions of each transmitter operating in the frequency band to be separated from the transmissions originating from other transmitters operating in the frequency band. Structurally, a transmitter that operates on such data is similar to the transmitter discussed above with respect to FIG. 1.

At the waveform reconstruction system, the inverse coding algorithm is applied to recover the original M-ary data sequence in a manner analogous to the embodiments described above with reference to FIGS. 3 and 4. Since a sequence of M-ary symbols has many more states than a binary sequence of the same length, the number of possible waveform graphs that need to be accumulated, or the length of time that is needed to obtain a good statistical average of any particular sequence, may be greater than in a simple binary data transmission system.

Figure 6:
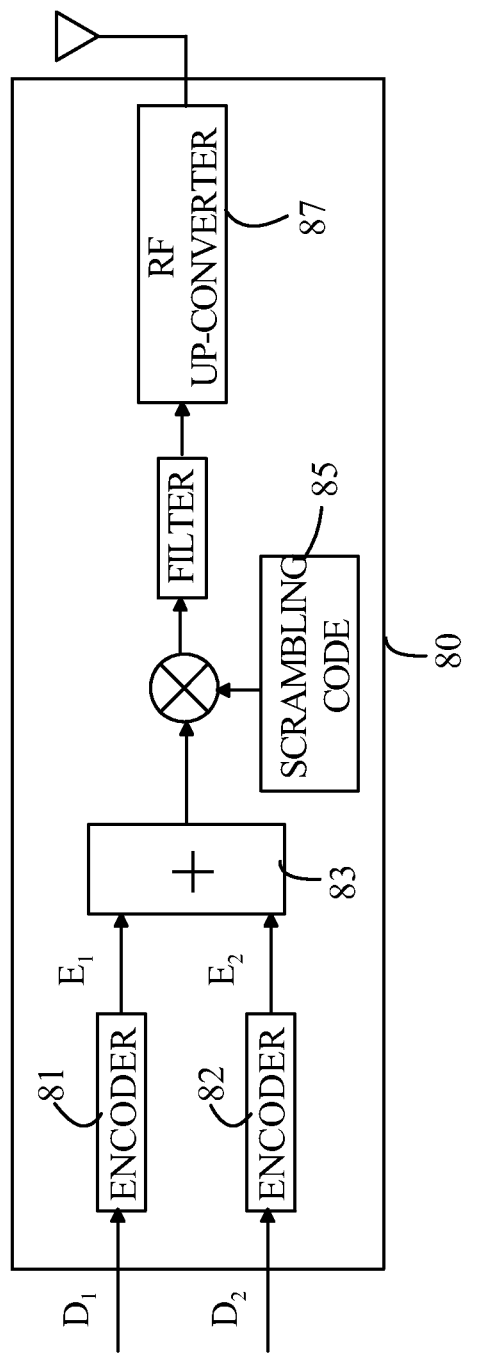
FIG. 6 illustrates a data transmitter that receives two data streams for transmission to a receiver.

The above-described embodiments operate on a single data stream that is input to the transmitter. However, embodiments of the present invention that operate on data that is generated by combining a plurality of data streams prior to scrambling and transmitting the data can also be constructed. Refer now to FIG. 6, which illustrates a data transmitter that receives two data streams for transmission to a receiver. Data transmitter 80 receives data streams D1 and D2. D1 and D2 are encoded by encoders 81 and 82, respectively, to provide encoded data streams E1 and E2, respectively. The codes used are chosen such that the encoded data streams occupy the desired bandwidth and are orthogonal to one another. That is, a combined data stream obtained by adding data streams E1 and E2 can be processed to recover D1 and D2 using orthogonal de-spreading codes.

The encoded data streams are combined in adder 83 to provide a combined encoded data stream that is further encoded with a scrambling code generated by scrambling code generator 85. The scrambling code is particular to the data transmitter and enables the combined encoded data to be recovered from a combined RF transmission in a manner analogous to that discussed above. The scrambled chip rate sequence is then up-converted and transmitted by RF up-converter 87.

Figure 7:
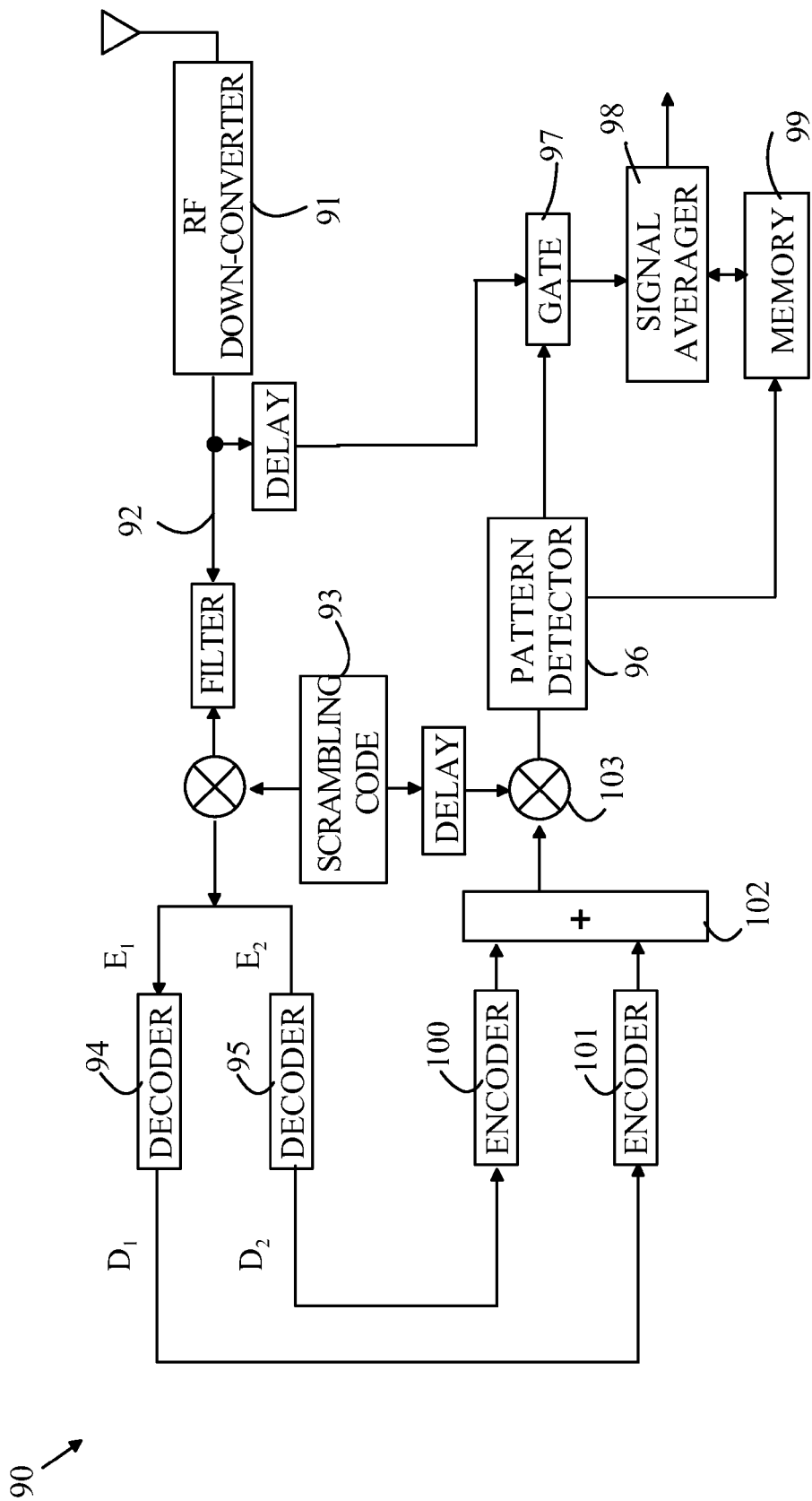
FIG. 7 illustrates a waveform reconstruction system according to another embodiment of the present invention.

Refer now to FIG. 7, which illustrates a waveform reconstruction system according to another embodiment of the present invention. Waveform reconstruction system 90 includes an RF down-converter 91 that receives the signal generated by data transmitter 80 together with transmissions from other similar transmitters operating in the same frequency band. The down-converted analog signal 92 is mixed with a descrambling code generated by code generator 93 which is synchronized with code generator 85 discussed above, then processed by decoders 94 and 95 to recover estimates of the original data streams D1 and D2. Decoder 94 decodes the data symbol stream encoded by encoder 81, and decoder 95 decodes the data stream encoded by encoder 82. Encoder 81 and decoder 94 use one spreading code while encoder 82 and decoder 95 use a second, orthogonal spreading code.

The data streams D1 and D2 should be the data streams that were encoded and sent at the transmitter being studied. This data stream can be re-encoded to provide an ideal spread and scrambled signal that is used as the input to the pattern detector as shown in FIG. 7. The data streams are converted to an ideal spread and scrambled chip-rate sequence by recoding the decoded signals using encoders 100 and 101, summing the re-coded signals with combiner 102, and mixing with scrambling code using mixer 103. The scrambling code is a delayed copy of the scrambling code generated by scrambling code generator 93 to achieve proper synchronization. Pattern detector 96 then examines the ideal spread and scrambled chip-rate sequence to determine if the data on node 92 should be input to signal averager 98. If the pattern matches, gate 97 is activated and the values received at node 92 are added to the average stored in memory 99 after being digitized and appropriately delayed.

In the above-described embodiments, the signal that is averaged is a delayed copy of the signal in which the pattern is detected. However, embodiments in which another signal that is correlated with the received signal is averaged can also be constructed. For example, if the transmitted signal is received by a plurality of receivers, an average signal from the down-converter at each of the transceivers can be formed and analyzed. Such analysis can provide information about the location of the transmitter. In addition, information about the channel characteristics can be derived from the various averaged signals.

Figure 8:
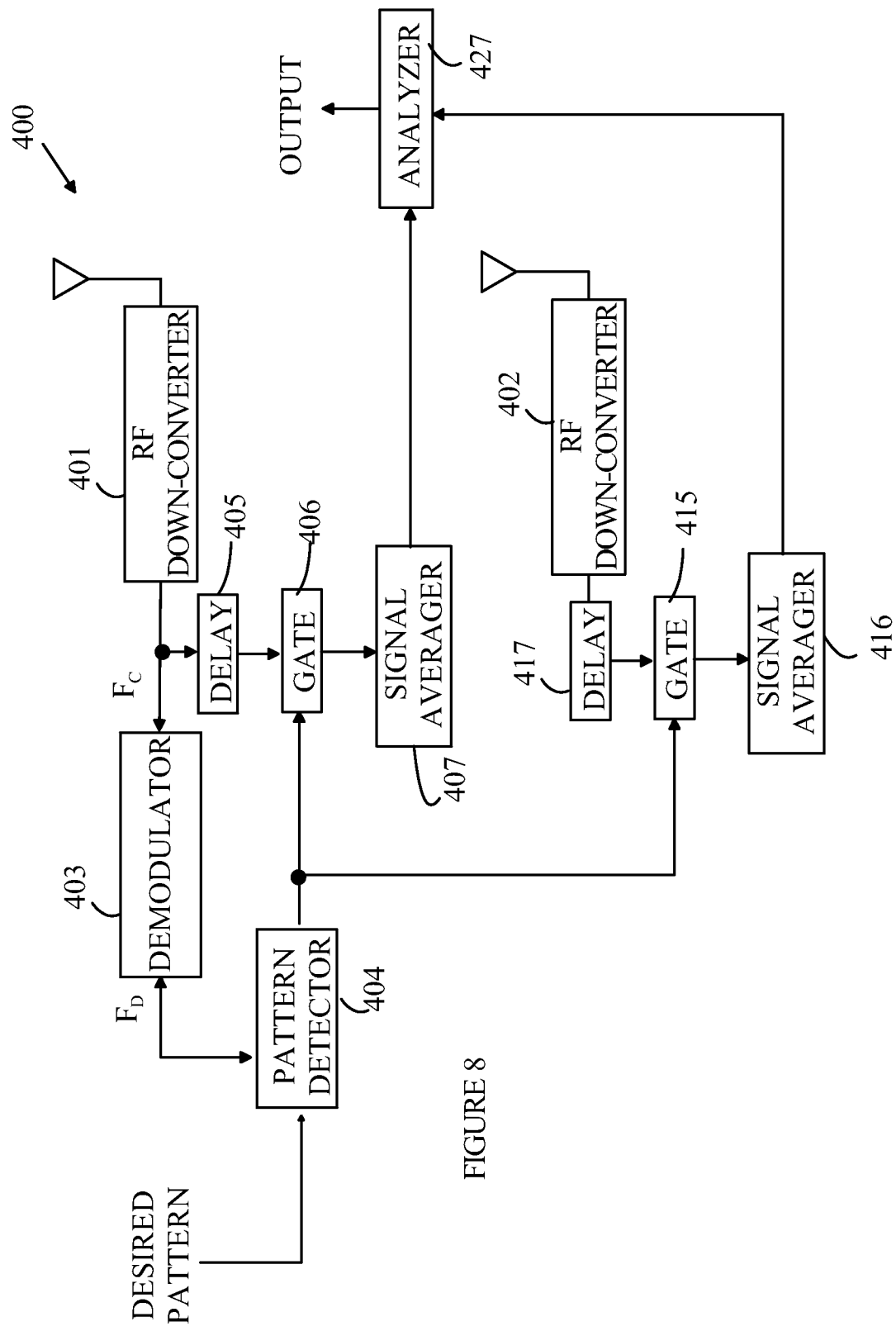
FIG. 8 illustrates a waveform reconstruction system according to another embodiment of the present invention.

Refer now to FIG. 8, which illustrates an embodiment of the present invention in which the outputs from two receivers are analyzed when a predetermined pattern is detected in the output from one of the receivers. System 400 includes two RF down-converters as shown at 401 and 402. For the purposes of the present discussion, it will be assumed that the two receivers have antennae that are displaced relative to one another, or have differing characteristics such as directionality. The signal form down-converter 401 is demodulated in demodulator 403 and input to a pattern detector 404, which examines the demodulated signal for a predetermined desired pattern. When the pattern is detected, pattern detector 404 triggers the gates in two signal averaging sub-circuits. The first sub-circuit operates on the output of RF down-converter 401 and includes delay circuit 405, gate 406 and signal averager 407. The second circuit operates on the output of RF down-converter 402 and includes delay circuit 417, gate 415, and signal averager 416. The averaged signals generated by averagers 407 and 416 are input to an analyzer 427 that compares the averages according to the protocol being implemented.

The above-described Summary of the Invention and embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A system comprising:
an RF down-converter that receives a signal and outputs a down-converted signal based on said received signal;
a demodulator that demodulates said down-converted signal to generate a recovered digital data stream;
a pattern detector that detects a predetermined pattern in said recovered digital data stream;
a delay generator outputs a delayed copy of a target signal correlated with said down-converted signal; and
a signal processing circuit that combines said delayed copy with previously received delayed copies to reconstruct an averaged waveform.

2. The system of claim 1 wherein said target signal comprises said down-converted signal.

3. The system of claim 2 wherein said pattern detector detects a plurality of different predetermined patterns in said received digital data stream and generates a code indicative of which of said plurality of patterns has been detected, and wherein said signal processing circuit comprises a memory for storing an average signal for each of a plurality of different portions of said down-converted signal, each portion corresponding to a different one of said predetermined patterns.

4. The system of claim 3 wherein said memory comprises a cyclic De Bruijn sequence.

5. The system of claim 4 wherein said average signal is a weighted average of delayed copies in which the portions of said delayed copies nearest an end of said delayed copy are given less weight than other portions of said delayed copies.

6. The system of claim 2 wherein said pattern detector comprises a decoder that generates a received data stream, said received data stream being re-encoded to generate an ideal data symbol stream, said ideal data symbol stream being used by said pattern detector to detect said predetermined pattern.

7. The waveform reconstruction system of claim 6 wherein said data transmitter encodes a plurality of data streams and wherein said waveform reconstruction system includes a decoder for each data stream and a re-encoder for each data stream, and a combiner to generate an ideal re-encoded combined waveform that is used by said pattern detector to detect said predetermined pattern.

8. The system of claim 2 wherein a plurality of transmitters operate simultaneously on a frequency band received by said RF receiver, each transmitter utilizing a different scrambling code to differentiate that transmitter's data from data transmitted on other transmitters on said frequency band and wherein said pattern detector comprises a de-scrambler and a de-spreader that generate said recovered digital data stream from a predetermined one of said transmitters, said digital data stream being used by said pattern detector to detect said predetermined pattern.

9. The system of claim 8 wherein said data transmitter encodes a plurality of data streams and wherein said system generates an ideal waveform by re-spreading each data stream to generate an ideal spread and scrambled chip-rate waveform that is used by said pattern detector to detect said predetermined pattern.

10. The system of claim 1 wherein said target signal is a signal generated from another RF down-converter.

11. A method for measuring a waveform, said method comprising:
providing an RF down-converter that receives a signal and outputs a down-converted signal;
demodulating said down-converted signal to generate a received digital data stream;
detecting a first predetermined pattern in said received digital data stream; and
in response to said detecting of said first predetermined pattern, combining a delayed copy of a portion of a target signal that is correlated with said down-converted signal with previously received delayed copies of said portion of target signal to provide a first averaged waveform.

12. The method of claim 11 wherein said target signal comprises said down-converted signal.

13. The method of claim 12 further comprising:
providing a memory for storing a plurality of averaged waveforms of said portion of said down-converted signal, said first averaged waveform being stored at a first location in said memory; and
detecting a second predetermined pattern in said received digital data stream and, in response to said detecting of said second predetermined pattern, combining a delayed copy of a portion of said down-converted signal with a previously received copy of said portion of said down-converted signal in said memory at a location different from first location.

14. The method of claim 13 wherein said memory comprises a cyclic De Bruijn sequence.

15. The method of claim 14 wherein said average signal is a weighted average of delayed copies in which the portions of said delayed copies nearest an end of said delayed copy are given less weight than other portions of said delayed copies.

16. The method of claim 12 wherein said down-converted signal is decoded, and then re-encoded to form an ideal data symbol stream that is used to detect said first predetermined pattern.

17. The method of claim 16 wherein a plurality of transmitters operate simultaneously on a frequency band received by said RF down-converter, each transmitter utilizing a different scrambling code to differentiate that transmitter's data from data transmitted on other transmitters on said frequency band and wherein said demodulating and decoding is replaced with de-scrambling and de-spreading to recover the data from a predetermined one of said transmitters, said recovered data being re-encoded and re-scrambled to form an ideal waveform that is used to detect said first predetermined pattern.

18. The method of claim 17 wherein detecting said first predetermined pattern comprises generating an ideal waveform by re-spreading one or more digital data streams, to form an ideal waveform that is used to detect said first predetermined pattern.

19. The method of claim 12 wherein said demodulating comprises decoding two or more data streams in said down-converted signal, re-encoding said two or more data streams and combining said two or more data streams to form an ideal waveform that is used to detect said first predetermined pattern.

20. The method of claim 11 wherein said target signal is a signal generated from another RF down-converter.

* * * * *